United States Patent Office 3,109,826
Patented Nov. 5, 1963

3,109,826
ROOM TEMPERATURE CURABLE ORGANO-
SILOXANE COMPOSITIONS
Frederick A. Smith, Kenmore, N.Y., assignor to Union
Carbide Corporation, a corporation of New York
No Drawing. Filed Dec. 28, 1960, Ser. No. 78,843
12 Claims. (Cl. 260—18)

This invention relates to room temperature curable organosiloxane compositions. More particularly, this invention relates to compositions containing hydroxy end-blocked organosiloxane fluids and a bis(alkoxysilyl) hydrocarbon compound and to the elastomers produced therefrom.

The present invention is based, in part, upon the discovery that compositions comprising (1) a hydroxy end-blocked diorganopolysiloxane fluid, (2) and bis(alkoxysilyl) hydrocarbon compound or partial hydrolyzate thereof, and (3) as a catalyst a metal salt of a carboxylic acid; are curable to organosiloxane elastomers at room temperature. These compositions can also contain a filler if desired.

The hydroxy end-blocked diorganopolysiloxane fluids which can be employed in the compositions of this invention are comprised of essentially linear polymeric chains composed of units of the formula:

[RR'SiO]         (1)

and which have hydroxy groups bonded to each of the terminal silicon atoms of each chain. In the above formula, R and R' represent organic radicals, as for example, monovalent hydrocarbon groups such as alkyl, aryl, alkaryl, aralkyl, cycloalkenyl, and alkenyl groups including methyl, ethyl, propyl, butyl, phenyl, phenylethyl, naphthyl, cyclopentyl, cyclohexyl, vinyl, allyl, cyclohexenyl and the like; and carbon-functional groups which are substituted hydrocarbon groups bonded to the silicon atom through a carbon to silicon linkage and in which groups the carbon-functional substituent is removed by at least two carbon atoms of a saturated hydrocarbon chain from silicon. Typical of such carbon-functional groups are: beta-cyanoethyl, gamma-cyanopropyl, cyanophenyl, gamma-nitropropyl, nitrophenyl, chlorophenyl, difluorophenyl, the fluorinated alkyl groups such as gamma, gamma, gamma-trifluoropropyl and the like.

The hydroxy end-blocked organopolysiloxane fluids are further characterized by viscosities at 25° C. of from about 100 centipoises up to about 2,000,000 centipoises and preferably in the range of from about 1,000 to about 50,000 centipoises. For the most part such organopolysiloxanes will vary from pourable liquids to viscous fluids which will slowly flow when poured. Such organopolysiloxanes are further characterized by an organic group to silicon atom ratio of from about 1.95:1 to 2:1 and contain one hydroxy group bonded to each of the terminal silicon atoms of the polymer chains.

The bis(alkoxysilyl) hydrocarbon compounds suitable for use in the present invention include the monomeric bis(alkoxysilyl) hydrocarbons of the following formula:

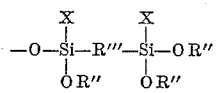         (2)

wherein R" represents an alkyl group, as for example, methyl, ethyl, propyl, butyl, hexyl, and the like; R'" represents a divalent hydrocarbon group containing up to 10 carbon atoms, such as, methylene, tetramethylene, ethylene, propylene, butylene decalene, phenylene, tolylene, xylylene, styrene, naphthylene, vinylene, and the like; and X represents a member selected from the class consisting of alkyl, aryl, and alkoxy, preferably X is an alkoxy group.

Illustrative of the alkyl groups that X represents are methyl, ethyl, propyl, butyl, octyl, and the like. Illustrative of the aryl groups that X represents are phenyl, tolyl, xylyl, and the like. Illustrative of the alkoxy groups that X represents are methoxy, ethoxy, propoxy, hexoxy, and the like.

The bis(alkoxysilyl) hydrocarbon compounds suitable for use in the present invention also include the liquid partial hydrolyzates of the bis(alkoxysilyl) hydrocarbon compounds of Formula 2 and can be represented by the formula:

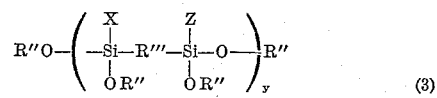         (3)

wherein R", R'" and X are as above defined, (y) is an integer of at least 2, and Z is an alkoxy group or a group of the formula

where R", R'" and X are as previously defined. These liquid partial hydrolyzates are generally obtained by effecting partial hydrolysis in water of the particular monomeric bis(alkoxysilyl) hydrocarbon compound in the presence of a small amount of acid to a point where the hydrolyzate is still liquid and water insoluble and it is possible to isolate a liquid partially hydrolyzed organosilicon compound. Thus, for example, bis(triethoxysilyl)ethane can be partially hydrolyzed by adding sufficient water thereto to hydrolyze one or two of the silicon-bonded alkoxy groups employing a small amount of an acid such as hydrochloric acid as the catalyst.

The metal salts of carboxylic acids which can be employed as the catalyst in preparing the room temperature-curable compositions of the present invention include the carboxylic acid salts of lead, tin, zirconium, iron, cadmium, titanium, calcium, and manganese. It is preferred that the carboxylic acid salts of the above metals be characterized by the property that the carboxylic acid radical contains less than 14 carbon atoms and more preferably from 3 to 14 carbon atoms. While the metal salts of acetic acid can be employed, it has been found that the acetic acid salts cause a rapid curing of the compositions to elastomer so as to make such a system difficult to handle. While the metal salts containing more than 14 carbon atoms are operable to cure the compositions to elastomers, it has been found that such salts leave an oily residue in the elastomer thereby making the elastomer feel greasy to the touch. It is preferred that the salt be soluble in the hydroxy end-blocked diorganopolysiloxane fluid although insoluble salts can be employed if they are properly dispersed in the system. Typical of the metal salts of carboxylic acid which are operative are the naphthenates, propionates, butyrates, hexoates, oleates, benzoates, laurates, linoleates, stearates, and octoates of the above metals.

While a filler is not necessary to form the room temperature-curing compositions of this invention, a filler can be employed, if desired, to give higher tensile strengths to the elastomers produced.

The fillers which can be employed in the compositions of this invention are any of those commonly employed in the art and include, for example, titanium dioxide, silica, of the fumed or precipitated type, calcium carbonate, diatomaceous earth, silica aerogel, carbon black and the like. When employing carbon black as the filler it is usually employed in combination with other fillers and is preferably not present in amounts more than 50% by weight of the total fillers present. It is preferred that at least 50% by weight of the total filler constitute a finely divided silica.

The amount of such fillers when employed in the compositions of this invention can be from 10 to 200 parts by weight per 100 parts by weight of the hydroxy end-blocked diorganopolysiloxane fluid. It is preferred to employ the fillers in amounts of from 20 to 60 parts by weight filler per 100 parts by weight of the diorganopolysiloxane fluid.

The amount of the bis(alkoxysilyl) hydrocarbon compound employed in the compositions of this invention can range from 0.1 to 10 parts by weight of the bis(alkoxysilyl) hydrocarbon compound per 100 parts by weight of the diorganopolysiloxane fluid. It is preferred that said bis(alkoxysilyl) hydrocarbon compound be employed in amounts of from 2 to 5 parts by weight per 100 parts by weight of the fluid.

The metal salt of the carboxylic acid, which is employed as the catalyst for the room-temperature curable compositions of the invention can be employed in amounts of from 0.5 to 5.0 parts by weight per 100 parts by weight of the diorganopolysiloxane fluid. It is preferred that such catalyst be employed in amounts of from 1 to 2 parts by weight per 100 parts by weight of the diorganopolysiloxane fluid.

The hydroxy end-blocked diorganopolysiloxane can be prepared by the steps of hydrolyzing or cohydrolyzing one or more monomeric silanes containing two silicon bonded hydrolyzable groups and treating the resulting hydrolyzate to prepare pure polymers in the form of cyclic siloxanes which are then subjected to equilibration (polymerization) procedures to yield essentially linear polymers of high molecular weight. Such polymers are then reacted with limited amounts of water and at elevated temperatures for varying periods of time to produce the desired starting end-blocked diorganopolysiloxane.

Preparation of the room temperature curing composition is accomplished by simply thoroughly admixing the ingredients and permitting curing to take place. In most instances it will be preferred to add the metal salt of the carboxylic acid last to prevent premature curing of the compositions.

The room temperature curing compositions of the present invention employing bis(alkoxysilyl) hydrocarbon compounds are characterized by desirable improved elongation and compressive strength properties. While the exact mechanism by which such improvement is not fully known or understood it is postulated that the increased length of the crosslinking unit of the bis(alkoxysilyl) hydrocarbon compound provides a more flexible crosslinking unit as compared to the crosslinking units present when silicates are employed for this same purpose.

The room temperature curable compositions of this invention are useful in the production of organosiloxane elastomers at room temperature. The compositions of the invention are particularly useful in sealing, puttying and caulking applications.

The following examples serve to illustrate the invention, all parts are by weight unless otherwise specified.

*Example 1*

A description of the preparation of a hydroxy end-blocked diorganopolysiloxane fluid.

Hexamethylcyclotrisiloxane (100 parts), water (45 parts) and ammonia (100 parts), are charged to an autoclave and heated to 150° C. for several hours. A dimethylpolysiloxane having a hydroxyl group bonded to each of the terminal silicon atoms thereof was obtained in about 75% yield. This dimethylpolysiloxane had a viscosity at room temperature of 50 centipoises, contained 3% by weight hydroxy groups and contained an average of from 14 to 16 [(CH$_3$)$_2$SiO] units per chain.

Approximately one gallon of the above material was mixed with 10 grams of calcium zeolite X, a synthetic zeolite, and heated to 150° C. for 35 hours to cause the material to condense and form a dimethylpolysiloxane fluid having a hydroxyl group bonded to each of the terminal silicon atoms thereof and having a higher viscosity. After cooling to room temperature, the calcium zeolite X was removed by filtration to yield a dimethylpolysiloxane fluid of 20,000 centipoises viscosity at room temperature and having a hydroxyl group bonded to each terminal silicon atom thereof.

*Example 2*

Ten grams of a hydroxy end-blocked dimethylpolysiloxane fluid prepared according to the procedure of Example 1 but having a viscosity of 28,000 centistokes at room temperature were placed in a small dish and thoroughly mixed with 0.5 gram of bis-triethoxysilylethane. Tin octoate containing 28 percent tin (0.2 gram) was then added and stirred into the mixture. Within thirty minutes at room temperature the mixture changed from a viscous fluid to a tough, springy, resilient, rubbery, elastomer. The material had permanently taken the shape of the dish in which it had been allowed to cure, and when stretched or deformed and released it immediately returned to its cured shape.

*Example 3*

Ten grams of a hydroxy end-blocked dimethylpolysiloxane fluid prepared according to the procedure of Example 1 but having a viscosity of 28,000 centistokes at room temperature were placed in a small dish and thoroughly mixed with 0.5 gram of a polymer prepared by the partial water hydrolysis and condensation of bis-(triethoxysilyl)ethane. Tin octoate containing 28 percent tin (0.2 gram) was then added and stirred into the mixture. Within 30 minutes at room temperature a soft, rubbery elastomer was obtained. This elastomer was characterized as having a lower modulus of elasticity than the elastomer prepared in Example 2. This lower modulus is thought to occur by virtue of the longer crosslinks in the elastomer.

*Example 4*

Ten grams of the following mixture were placed in a glass vessel:

100 grams of hydroxy end-blocked dimethylpolysiloxane, 36,000 centistokes viscosity.

35 grams of Celite Superfloss, a finely divided diatomaceous silica.

2 grams of Titanox RA–50, a finely divided titanium dioxide.

Then 0.5 gram of bis-triethoxysilylethane was added and the ingredients were thoroughly mixed. Tin octoate containing 28% tin (0.2 gram) was then added and thoroughly mixed. A tough rubbery solid elastomer of excellent resilience was obtained within 15 minutes at room temperature. The mechanical properties improved slightly over the next few hours, but beyond this they remained constant. This elastomer having a silica filler had appreciably better cohesive strength than the elastomer described in Examples 2 and 3.

What is claimed is:

1. A composition of matter curable to an elastomer at room temperature which comprises (1) 100 parts by weight of a diorganopolysiloxane fluid having a hydroxy group bonded to each of the terminal silicon atoms thereof, said fluid being an essentially linear diorganopolysiloxane composed of units of the formula:

wherein R and R' are monovalent organic radicals selected from the class consisting of monovalent hydrocarbon groups and monovalent carbon-functional substituted hydrocarbon groups, said substituted hydrocarbon groups being bonded to the silicon atom through a carbon to silicon linkage and wherein the carbon-functional substituent is removed by at least two carbon atoms of a saturated hydrocarbon chain from the silicon atom, said fluid having a viscosity of from 100 centipoises to 2,000,000 centipoises at room temperature and having an organic group to silicon atom ratio of from about 1.95:1 to 2:1, (2) from 0.1 to 10 parts by weight of a bis(alkoxysilyl) hydrocarbon compound containing at least four alkoxy groups, said bis(alkoxysilyl) hydrocarbon compound being selected from the class consisting of compounds of the formula:

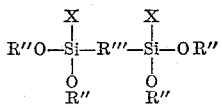

and the partial hydrolyzates thereof, wherein R'' is an alkyl group, R''' is a divalent hydrocarbon group containing up to 10 carbon atoms, and X is a member of the class consisting of alkyl, aryl, and alkoxy groups and (3) from 0.5 to 5 parts by weight of a metal salt of a carboxylic acid wherein the metal is selected from the class consisting of lead, tin, zirconium, iron, cadmium, titanium, calcium and manganese.

2. A composition of matter curable to an elastomer at room temperature which comprises (1) 100 parts by weight of a diorganopolysiloxane fluid having a hydroxy group bonded to each of the terminal silicon atoms thereof, said fluid being an essentially linear diorganopolysiloxane composed of units of the formula:

wherein R and R' are monovalent organic radicals selected from the class consisting of monovalent hydrocarbon groups and monovalent carbon-functional substituted hydrocarbon groups, said substituted hydrocarbon groups being bonded to the silicon atom through a carbon to silicon linkage and wherein the carbon-functional substituent is removed by at least two carbon atoms of a saturated hydrocarbon chain from the silicon atom, said fluid having a viscosity of from 1000 centipoises to 50,000 centipoises at room temperature and having an organic group to silicon atom ratio of from about 1.95:1 to 2:1, (2) from 2 to 5 parts by weight of a bis(alkoxysilyl) hydrocarbon compound containing at least four alkoxy groups, said bis(alkoxysilyl) hydrocarbon compound being selected from the class consisting of compounds of the formula:

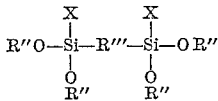

and the partial hydrolyzates thereof, wherein R'' is an alkyl group, R''' is a divalent hydrocarbon group containing up to 10 carbon atoms, and X is a member of the class consisting of alkyl, aryl, and alkoxy groups, and (3) from 1 to 2 parts by weight of a metal salt of a carboxylic acid wherein the metal is selected from the class consisting of lead, tin, zirconium, iron, cadmium, titanium, calcium, and manganese.

3. A composition of matter curable to an elastomer at room temperature which comprises (1) 100 parts by weight of a dimethylpolysiloxane fluid having a hydroxy group bonded to each of the terminal silicon atoms thereof, said fluid being an essentially linear dimethylpolysiloxane composed of units of the formula:

said fluid having a viscosity of from 1000 centipoises to 50,000 centipoises at room temperature and having a methyl group to silicon atom ratio of from about 1.95:1 to 2:1, (2) from 0.1 to 10 parts by weight of bis(triethoxysilyl)ethane and (3) from 0.5 to 5 parts by weight of tin octoate.

4. A composition of matter curable to an elastomer at room temperature which comprises (1) 100 parts by weight of a diorganopolysiloxane fluid having a hydroxy group bonded to each of the terminal silicon atoms thereof, said fluid being an essentially linear diorganopolysiloxane composed of units of the formula:

wherein R and R' are monovalent organic radicals selected from the class consisting of monovalent hydrocarbon groups and monovalent carbon-functional substituted hydrocarbon groups, said substituted hydrocarbon groups being bonded to the silicon atom through a carbon to silicon linkage and wherein the carbon-functional substituent is removed by at least two carbon atoms of a saturated hydrocarbon chain from the silicon atom, said fluid having a viscosity of from 100 centipoises to 2,000,000 centipoises at room temperature and having an organic group to silicon atom ratio of from about 1.95:1 to 2:1, (2) from 0.1 to 10 parts by weight of a bis(alkoxysilyl) hydrocarbon compound containing at least four alkoxy groups, said bis(alkoxysilyl) hydrocarbon compound being selected from the class consisting of compounds of the formula:

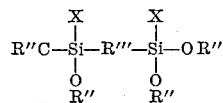

and the partial hydrolyzates thereof, wherein R'' is an alkyl group, R''' is a divalent hydrocarbon group containing up to 10 carbon atoms, and X is a member of the class consisting of alkyl, aryl, and alkoxy groups, (3) from 10 to 200 parts by weight of a filler and (4) from 0.5 to 5 parts by weight of a metal salt of a carboxylic acid wherein the metal is selected from the class consisting of lead, tin, zirconium, iron, cadmium, titanium, calcium, and manganese.

5. A composition of matter curable to an elastomer at room temperature which comprises (1) 100 parts by weight of a diorganopolysiloxane fluid having a hydroxy group bonded to each of the terminal silicon atoms thereof, said fluid being an essentially linear diorganopolysiloxane composed of units of the formula:

where R and R' are monovalent organic radicals selected from the class consisting of monovalent hydrocarbon groups and monovalent carbon-functional substituted hydrocarbon groups, said substituted hydrocarbon groups being bonded to the silicon atom through a carbon to silicon linkage and wherein the carbon-functional substituent is removed by at least two carbon atoms of a saturated hydrocarbon chain from the silicon atom, said fluid having a viscosity of from 1000 to 50,000 centipoises at room temperature and having an organic group to silicon atom ratio of from about 1.95:1 to 2:1, (2) from 2 to 5 parts by weight of bis-(alkoxysily) hydrocarbon compound containing at least four alkoxy groups said bis(alkoxysilyl) hydrocarbon compound being selected from the class consisting of compounds of the formula:

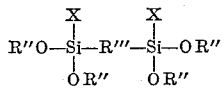

and the partial hydrolyzates thereof, wherein R″ is an alkyl group, R‴ is a divalent hydrocarbon group containing up to 10 carbon atoms, and X is a member of the class consisting of alkyl, aryl and alkoxy groups, (3) from 20 to 60 parts by weight of a filler and (4) from 1 to 2 parts by weight of a catalyst selected from the class consisting of the lead, tin, zirconium, iron, cadmium, titanium, calcium, and manganese salts of a carboxylic acid.

6. A composition of matter curable to an elastomer at room temperature which comprises (1) 100 parts by weight of a dimethylpolysiloxane fluid having a hydroxy group bonded to each of the terminal silicon atoms thereof, said fluid being an essentially linear dimethylpolysiloxane composed of units of the formula:

said fluid having a viscosity of from 1000 centipoises to 50,000 centipoises at room temperature and having a methyl group to silicon atom ratio of from about 1.95:1 to 2:1, (2) from 2 to 5 parts by weight of bis(triethoxysilyl)ethane, (3) from 20 to 60 parts by weight of a finely divided silica filler and (4) from 1 to 2 parts by weight of tin octoate.

7. The cured composition obtained from a mixture of ingredients comprising (1) 100 parts by weight of a diorganopolysiloxane fluid having a hydroxy group bonded to each of the terminal silicon atoms thereof, said fluid being an essentially linear diorganopolysiloxane composed of units of the formula:

wherein R and R′ are monovalent organic radicals selected from the class consisting of monovalent hydrocarbon groups and monovalent carbon-functional substituted hydrocarbon groups, said substituted hydrocarbon groups being bonded to the silicon atom through a carbon to silicon linkage and wherein the carbon-functional substituent is removed by at least two carbon atoms of a saturated hydrocarbon chain from the silicon atom, said fluid having a viscosity of from 100 cenitpoises to 2,000,000 centipoises at room temperature and having an organic group to silicon atom ratio of from about 1.95:1 to 2:1, (2) from 0.1 to 10 parts by weight of a bis(alkoxysilyl) hydrocarbon compound containing at least four alkoxy groups, said bis(alkoxysilyl) hydrocarbon compound being selected from the class consisting of compounds of the formula:

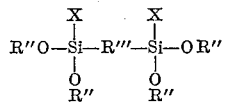

and the partial hydrolyzates thereof, wherein R″ is an alkyl group, R‴ is a divalent hydrocarbon group containing up to 10 carbon atoms, and X is a member of the class consisting of alkyl, aryl, and alkoxy groups and (3) from 0.5 to 5 parts by weight of a metal salt of a carboxylic acid wherein the metal is selected from the class consisting of lead, tin, zirconium, iron, cadmium, titanium, calcium, and manganese.

8. The cured composition obtained from a mixture of ingredients comprising (1) 100 parts by weight of a diorganopolysiloxane fluid having a hydroxy group bonded to each of the terminal silicon atoms thereof, said fluid being an essentially linear diorganopolysiloxane composed of units of the formula:

wherein R and R′ are monovalent organic radicals selected from the class consisting of monovalent hydrocarbon groups and monovalent carbon-functional substituted hydrocarbon groups, said substituted hydrocarbon groups being bonded to the silicon atom through a carbon to silicon linkage and wherein the carbon-functional substituent is removed by at least two carbon atoms of a saturated hydrocarbon chain from the silicon atom, said fluid having a viscosity of from 1000 centipoises to 50,000 centipoises at room temperature and having an organic group to silicon atom ratio of from about 1.95:1 to 2:1, (2) from 2 to 5 parts by weight of a bis(alkoxysilyl) hydrocarbon compound containing at least four alkoxy groups, said bis(alkoxysilyl) hydrocarbon compound being selected from the class consisting of compounds of the formula:

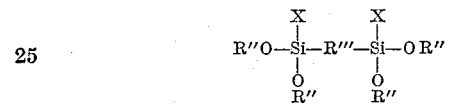

and the partial hydrolyzates thereof, wherein R″ is an alkyl group, R‴ is a divalent hydrocarbon group containing up to 10 carbon atoms, and X is a member of the class consisting of alkyl, aryl, and alkoxy groups, and (3) from 1 to 2 parts by weight of a metal salt of a carboxylic acid wherein the metal is selected from the class consisting of lead, tin, zirconium, iron, cadmium, titanium, calcium, and manganese.

9. The cured composition obtained from a mixture of ingredients comprising (1) 100 parts by weight of a dimethylpolysiloxane fluid having a hydroxy group bonded to each of the terminal silicon atoms thereof, said fluid being an essentially linear dimethylpolysiloxane composed of units of the formula:

said fluid having a viscosity of from 1000 centipoises to 50,000 centipoises at room temperature and having a methyl group to silicon atom ratio of from about 1.95:1 to 2:1, (2) from 0.1 to 10 parts by weight of bis(triethoxysilyl)ethane and (3) from 0.5 to 5 parts by weight of tin octoate.

10. The cured composition obtained from a mixture of ingredients comprising (1) 100 parts by weight of a diorganopolysiloxane fluid having a hydroxy group bonded to each of the terminal silicon atoms thereof, said fluid being an essentially linear diorganopolysiloxane composed of units of the formula:

wherein R and R′ are monovalent organic radicals selected from the class consisting of monovalent hydrocarbon groups and monovalent carbon-functional substituted hydrocarbon groups, said substituted hydrocarbon groups being bonded to the silicon atom through a carbon to silicon linkage and wherein the carbon-functional substituent is removed by at least two carbon atoms of a saturated hydrocarbon chain from the silicon atom, said fluid having a viscosity of from 100 centipoises to 2,000,000 centipoises at room temperature and having an organic group to silicon atom ratio of from about 1.95:1 to 2:1, (2) from 0.1 to 10 parts by weight of a bis(alkoxysilyl hydrocarbon compound containing at least four alkoxy groups said bis(alkoxysilyl) hydrocarbon compound being selected from the class consisting of compounds of the formula:

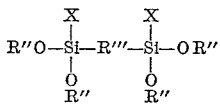

and the partial hydrolyzates thereof, wherein R″ is an alkyl group, R‴ is a divalent hydrocarbon group containing up to 10 carbon atoms, and X is a member of the class consisting of alkyl, aryl, and alkoxy groups, (3) from 10 to 200 parts by weight of a filler and (4) from 0.5 to 5 parts by weight of a metal salt of a carboxylic acid wherein the metal is selected from the class consisting of lead, tin, zirconium, iron, cadmium, titanium, calcium, and manganese.

11. The cured composition obtained from a mixture of ingredients comprising (1) 100 parts by weight of a diorganopolysiloxane fluid having a hydroxy group bonded to each of the terminal silicon atoms thereof, said fluid being an essentially linear diorganopolysiloxane composed of units of the formula:

where R and R′ are monovalent organic radicals selected from the class consisting of monovalent hydrocarbon groups and monovalent carbon-functional substituted hydrocarbon groups, said substituted hydrocarbon groups being bonded to the silicon atom through a carbon to silicon linkage and wherein the carbon-functional substituent is removed by at least two carbon atoms of a saturated hydrocarbon chain from the silicon atom, said fluid having a viscosity of from 1000 to 50,000 centipoises at room temperature and having an organic group to silicon atom ratio of from about 1.95:1 to 2:1, (2) from 2 to 5 parts by weight of bis-(alkoxysilyl) hydrocarbon compound containing at least four alkoxy groups said bis(alkoxysilyl) hydrocarbon compound being selected from the class consisting of compounds of the formula:

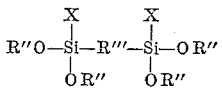

and the partial hydrolyzates thereof, wherein R″ is an alkyl group, R‴ is a divalent hydrocarbon group containing up to 10 carbon atoms, and X is a member of the class consisting of alkyl, aryl, and alkoxy groups, (3) from 20 to 60 parts by weight of a filler and (4) from 1 to 2 parts by weight of a catalyst selected from the class consisting of the lead, tin, zirconium, iron, cadmium, titanium, calcium, and manganese salts of a carboxylic acid.

12. The cured composition obtained from a mixture of ingredients comprising (1) 100 parts by weight of a dimethylpolysiloxane fluid having a hydroxy group bonded to each of the terminal silicon atoms thereof, said fluid being an essentially linear dimethylpolysiloxane composed of units of the formula:

said fluid having a viscosity of from 1000 centipoises to 50,000 centipoises at room temperature and having a methyl group to silicon atom ratio of from about 1.95:1 to 2:1, (2) from 2 to 5 parts by weight of bis(triethoxysilyl)ethane, (3) from 20 to 60 parts by weight of a finely divided silica filler and (4) from 1 to 2 parts by weight of tin octoate.

References Cited in the file of this patent
UNITED STATES PATENTS

| | | |
|---|---|---|
| 2,843,555 | Berridge | July 15, 1958 |
| 2,902,467 | Chipman | Sept. 1, 1959 |
| 2,927,907 | Polmanteer | Mar. 8, 1960 |

FOREIGN PATENTS

| | | |
|---|---|---|
| 216,878 | Australia | Aug. 29, 1958 |